United States Patent [19]

Apa

[11] Patent Number: 5,189,949
[45] Date of Patent: Mar. 2, 1993

[54] CAPPUCCINO DISPENSER

[76] Inventor: Vincenzo Apa, 3733 Lancewood Dr., Coral Springs, Fla. 33065

[21] Appl. No.: 715,760

[22] Filed: Jun. 14, 1991

Related U.S. Application Data

[63] Continuation-in-part of Ser. No. 554,792, Jul. 20, 1991.

[51] Int. Cl.$^5$ .............................. A23C 3/02; A23F 5/00
[52] U.S. Cl. .................................. 99/453; 99/323.3; 99/452
[58] Field of Search .............. 99/452, 287, 294, 300, 99/323.3, 453; 285/921, 319, 13, 14; 261/DIG. 75, DIG. 76; 366/176

[56] References Cited

U.S. PATENT DOCUMENTS

| | | | |
|---|---|---|---|
| 3,166,611 | 1/1965 | Conant et al. | 261/DIG. 38 |
| 4,580,816 | 4/1986 | Campbell et al. | 285/921 |
| 4,715,274 | 12/1987 | Paoletti | 99/452 |
| 4,735,133 | 4/1988 | Paoletti | 366/176 |
| 4,949,631 | 8/1990 | Fregnan | 99/452 |
| 4,993,756 | 2/1991 | Bechu | 285/921 |

FOREIGN PATENT DOCUMENTS 0672241  11/1989  Switzerland ........................ 99/294

*Primary Examiner*—Harvey C. Hornsby
*Assistant Examiner*—Tony Soohoo

[57] ABSTRACT

An aeration and mixing device used for mixing milk or cream, air and steam for cappuccino to expedite in the dispensing of a properly mixed cappuccino. The device includes snap on fittings for the steam nozzle which has also an air inlet channel of a predetermined size external disposed for cleaning and a mixing chamber all of which is attached to a conventional steam line found on cappuccino devices. The device can be disassembled for cleaning purposes.

3 Claims, 1 Drawing Sheet

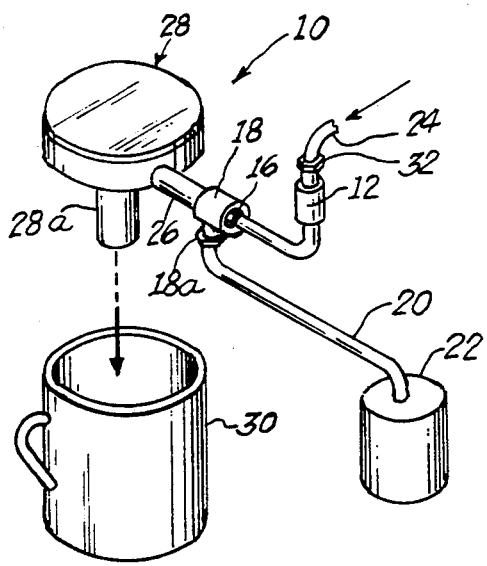
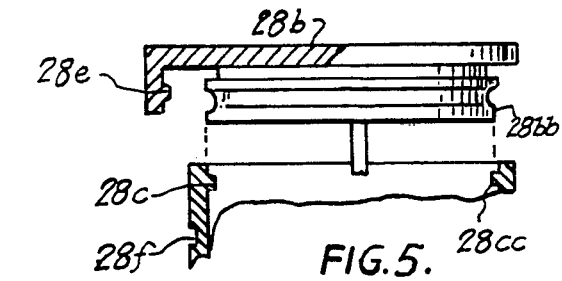
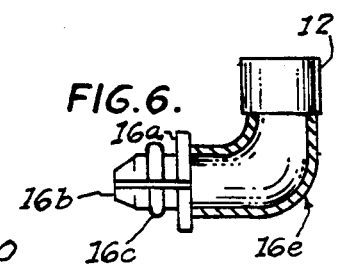
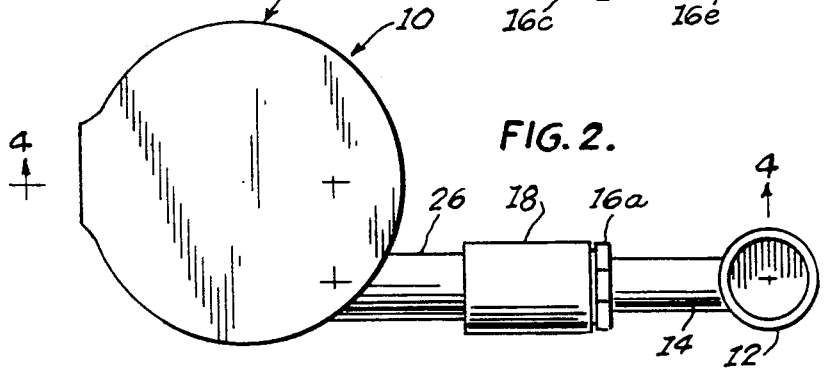
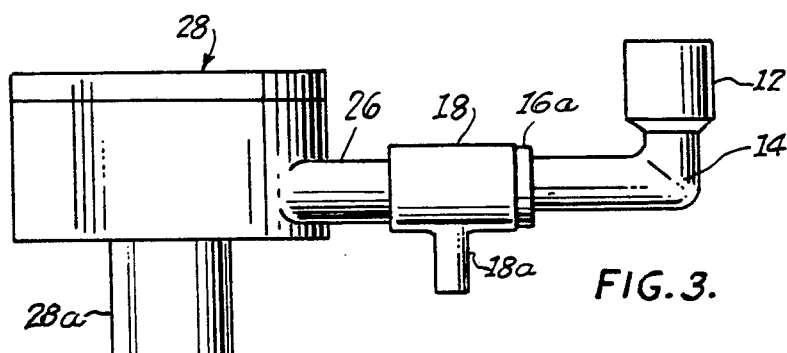
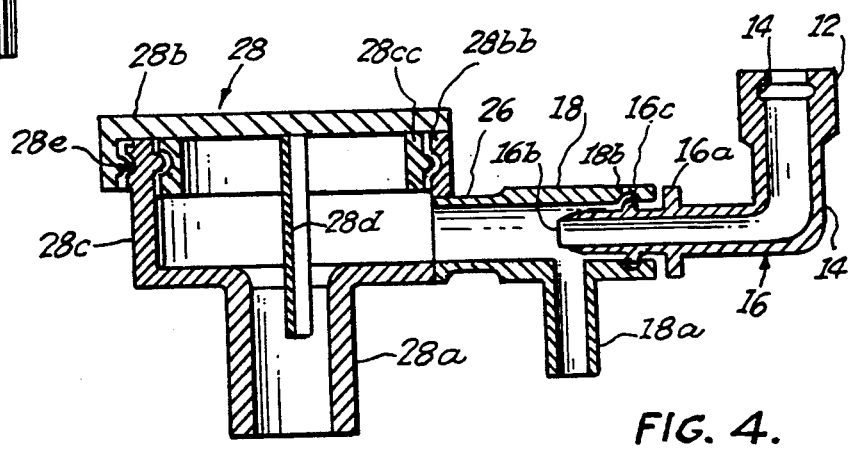

CAPPUCCINO DISPENSER

This application is a continuation-in-part of U.S. Pat. application Ser. No. 07/554,792 filed Jul. 20, 1991.

BACKGROUND OF THE INVENTION

1. Field of the Invention

This invention relates to an improved cappuccino air injector and dispenser and in particular to a device that can be attached to a steam source found in current cappuccino devices, which aids in the mixing and foaming of the steam and milk mixture to expedite, especially in a commercial environment, the dispensing of cappuccino, and can be expeditiously taken apart for cleaning for improved hygiene.

2. Description of the Prior Art

Capuccino is a beverage in which espresso coffee is mixed or topped with steamed milk or cream. Devices are known which provide for the making of cappuccino. In the present day devices, milk or cream are mixed with steam to provide a foam or froth mixture that is then added to a cup containing coffee. When used in a commercial or restaurant environment, it can be very time consuming for the server to make cappuccino. Also the foaming or frothing of the end result is not always as desired. Hygiene in a restaurant environment is very important. Conventional emulsion devices are often complex in construction and are time consuming to take apart and difficult to clean very tiny valve-like passageways.

In U.S. Pat. No. 4,715,274 issued to Paoletti Dec. 29, 1987, an emulsifier unit is shown that in one embodiment includes an air intake conduit that has additional pin needle valve structure that works to regulate the air and milk mixture in the device. In an alternate embodiment in Paoletti, there is shown a complex nozzle through which steam is passed that includes several tiny passageways for both milk and air, making the resultant steam nozzle complicated in construction and design and very difficult for proper cleaning because of the small ports and passageways. In U.S. Pat. No. 4,779,519 issued to Giuliano Oct. 25, 1988, an emulsifier assembly is shown having a very complex suction chamber air intake line. Other emulsifier nozzles such as U.S. Pat. No. 4,949,631 issued to Fregman on Aug. 21, 1990 are shown of complex internal construction which makes it difficult and time-consuming for cleaning which is especially important in a commercial setting and with the increased complexity of construction, more costly. The present invention overcomes these problems by providing an overall system that provides reliable and consistent proper mixture of air, milk and steam necessary for the proper froth for cappuccino while at the same time being simple in construction, usage and cleaning.

The present invention provides a mixer-dispenser that can attach to a conventional steam line found in an espresso or cappuccino machine or that can be mounted as part of original equipment which greatly expedites the making of cappuccino by mixing milk and steam together with a predetermined air amount in the proper ratio to provide a mixture that is dispensed directly into a cup containing espresso coffee to produce a consistent foam or frothy mixture of the steamed milk or cream expeditiously.

BRIEF SUMMARY OF THE INVENTION

A device for mixing steam and milk or cream in conjunction with an air inlet that provides a predetermined amount of air to ensure a proper foam mixture of the milk and steam, and a dispensing outlet for dispensing the aerated mixture into a receptacle such as a cup.

The invention is comprised of a steam L-shaped nozzle having an external longitudinal air inlet channel in communication with a main inlet conduit, a second inlet for drawing milk connected to the main inlet conduit, a cylindrical mixing chamber connected to the outlet of the main inlet conduit, and a dispensing outlet in fluid communication with the cylindrical mixing chamber.

The mixing chamber also includes a partial barrier wall disposed to divert the air, steam and milk mixture receiving under pressure from the steam inlet conduit which aids in dispensing the mixture through a bottom outlet from the chamber.

One feature of the device is that the L-shaped steam nozzle with the external longitudinal air inlet channel can readily be disengaged from the main inlet conduit and steam source to allow for fast cleaning of the device. The L-shaped steam nozzle includes an annular bead that connects with an annular groove in the steam inlet conduit to form a snap out fitting. The mixing chamber also includes a lid or cover that can be quickly removed while the other components are also removably connected for ease of cleaning.

The main inlet conduit includes a second inlet conduit perpendicularly joined to the main inlet conduit such that when a steam jet is forced through the steam nozzle, lower internal pressure is created in the second inlet conduit which is attached to a source of milk or cream. In addition, the steam nozzle which is snapped into one end of the main steam line includes a longitudinal external groove of a predetermined size to permit the exact proper amount of air needed to create proper froth of steam and milk. The main steam conduit includes an annular groove that engages an annular bead on the steam nozzle holding it in place but allowing it to snap in and out of the main steam line. The air is drawn in by the lower internal pressure from ambient air by the action of the steam flow at the nozzle end which is precisely aligned with the second (milk) inlet opening to provide the proper amount of air necessary for the correct froth consistency that is mixed with the steam and milk as it comes together on the main inlet conduit. The entire mixture of air, milk and steam is forced under pressure into the cylindrical mixing chamber where it swirls around and also strikes the diverter plate and is forced out the bottom of the mixing chamber through the bottom outlet. The air inlet channel in the external surface of the L-shaped steam nozzle extends from within the main inlet conduit at the steam nozzle head to an outside location exposed to the ambient air. The area cross-section size of the air inlet channel is predetermined to insure precisely obtained froth of the exact consistency.

In operation, to use the device, the second (milk) inlet conduit connected into the inlet line includes a small hose or tube that is placed in a container of milk or cream. The steam nozzle is attached to a steam fitting on the espresso or cappuccino machine steam source. The entire unit is mounted such that beneath the cylindrical mixing chamber outlet is a suitable area for placing a cup containing espresso coffee so that the entire broth or foam mixture of milk, air and steam can be dispensed directly into the coffee cup. Thus it is a one step operation to fill the remainder of the coffee filled cup with the steamy milk mixture. Note that although milk or cream has been described as the liquid that is drawn into the main steam line, it could also be a mixture of espresso coffee and the milk so that when dispensed the entire mixture is a foam properly mixed together and dispensed directly into a cup. Liquors or other liquids could also be included to operate with the device.

The steam nozzle includes a longitudinal square groove that is an air inlet channel that communicates between the main inlet conduit within which the steam nozzle is positioned and the ambient air so that the air inlet channel allows air to be drawn in by suction when steam is passing through the main steam conduit. The air inlet channel is of a predetermined length, width and depth so that only a certain amount of air can pass through the air inlet channel from the ambient environment as a function of steam and milk pressure passing into the main steam chamber. This eliminates the need for some adjustment which could lead to variations in the consistency of the froth in the milk and steam mixture. Cleaning of the groove is quite simple because of its external location.

The steam nozzle includes a forward nose section which is particularly positioned when snapped in place so that the nozzle open end lies directly over or slightly downstream of the second inlet port which comes from the milk source. The air inlet longitudinal channel is externally disposed along a peripheral portion of the steam nozzle. There is also sufficient space around the nozzle head which is conical and the inside cylindrical surface of the main steam conduit to allow air traveling through the air inlet channel to expand around the nozzle to form a proper flow pattern with the mixture of air, steam and milk.

It is an object of this invention to provide an improved mixing and dispensing device for expediting the dispensing of cappuccino, and an air channel inlet that is easy to clean.

It is another object of this invention to provide a device which can be readily attached to an existing espresso or cappuccino machine that has a steam source that provides the proper consistency and foaming of the steam milk mixture for proper cappuccino.

And yet another object of this invention is to provide a device that can be attached to commercial cappuccino espresso machines to aid and expedite in the serving of cappuccino with the proper consistency and ingredients and is easily disassembled for cleaning.

In accordance with these and other objects which will be apparent hereinafter, the instant invention will now be described with particular reference to the accompanying drawings.

BRIEF DESCRIPTION OF THE DRAWINGS

FIG. 1 is a perspective view showing the invention.
FIG. 2 is a top plan view of the device shown in FIG. 1.
FIG. 3 is a side elevational view of the invention.
FIG. 4 is a side elevational view in cross section of the invention.
FIG. 5 is a cut away view and side elevational cross section showing the upper portion of the mixing chamber.
FIG. 6 is a side elevational view of the steam nozzle and air channel used in the present invention.

PREFERRED EMBODIMENT OF THE INVENTION

Referring now to the drawings and specifically FIG. 1, the invention is shown generally at 10, comprised of a steam source inlet tube 24 attached to a steam fitting 32 that snaps onto an L-shaped steam nozzle 16 at inlet 12 in fluid communication snaps on to the main inlet chamber 18. Inlet opening 12 includes a snap on annular groove 14 that connects to steam fitting 32.

The main inlet chamber 18 includes second inlet conduit 18a which is integrally connected to inlet conduit 18a, and an outlet conduit 26 attached to the outlet side of main inlet conduit 18. Conduit 26 provides and is in fluid communication with a cylindrical mixing chamber 28. A cup 30 is shown placed beneath the outlet 28a from the mixing chamber 28 for receiving the milk, steam and air mixture.

A milk container 22 is attached to a hose 20 that is connected to the main inlet conduit 18 through which a suction will withdraw any liquid in container 22 such as milk or steam through second inlet 18a. FIGS. 2, 3, and 4 show the steam nozzle head 16b aligned with the opening of second inlet 18a to provide the suction and space for initial mixing.

To operate the invention, the device 10 is attached to a steam source 24 which is found on current cappuccino and espresso machines. Milk or cream is added to container 22 and when the steam inlet 24 is actuated (by a device not shown), steam is then forced into the steam nozzle 16 through the air inlet conduit 18 into the mixing chamber 28. At the same time milk or cream in container 22 will be drawn through tube 20 into the main inlet conduit 18. The steam nozzle 16 includes an air inlet groove 16d (FIG. 5) of a predetermined width and depth (0.0002 inches) to permit the exact amount of air to be received into the main inlet chamber 18 simultaneously with the steam flow from nozzle end 16 having a passage diameter of 0.08 inches and milk flow into chamber 18. The entire air, steam and milk mixture is then forced under pressure from conduit 26 into a cylindrical mixing chamber 28 where it is then dispensed out through the lower outlet 28a into cup 30.

Referring now to FIG. 2, the invention 10 is shown comprised of the inlet connector 12, part of steam nozzle 16 which is removably connected to the main inlet conduit 18, and mixing chamber 28. The steam nozzle 16 can be manually pulled apart from the main inlet conduit 18 for cleaning because of annular bead 16c which engages annular groove 18b in the joined position when barrier wall 16a abuts the end face of conduit 18 at one end.

Referring now to FIGS. 3 and 4, the operation of the device will be described. The inlet connector 12 includes a grooved female connector 14 which attaches to a steam fitting 32 threaded at one end to connect to steam line 24 (FIG. 1) (currently provided in cappuccino and espresso machines) and having a bead at the other end to fit annularly in groove 14 as a snap-on. The main inlet conduit 18, includes an annular groove 18b around female inlet opening that receives the male end of L-shaped nozzle 16 which includes an annular bead 16c that fits into groove 18b to hold steam nozzle 16 to conduit 18. Providing the exact amount of air necessary for correct froth is accomplished by the air inlet channel 16d (FIG. 6). The air inlet channel 16d size is determined in conjunction with the diameter of the milk and steam conduits to obtain the optimum froth.

The mixing chamber 28 which continues the mixing of steam, milk and air is cylindrical and includes a housing 28c and a lower outlet 28a for dispensing the mixture. A bead 28cc holds the cap on along with bead 28e. The cap 28b is removable for cleaning. The cap also includes an internal barrier wall 28d perpendicularly mounted that is slightly less in width than the diameter of the outlet 28a so that as steam and milk are received under pressure with air from the conduit 26 of the device into the mixing chamber 28. The barrier wall will aid in dispensing the mixture and diverting it into the outlet 28a.

FIG. 5 shows the mixing chamber cap 28b that includes groove 28bb that receives bead 28cc which allow it to be easily removed or tightly sealed on the top of the mixing chamber for operation.

FIG. 6 shows L-shaped nozzle 16 including the longitudinal air inlet channel 16d, barrier 16a which stops nozzle end at the correct location in main inlet conduit 18. The nozzle 16 includes annular bead snap on connection between main inlet conduit 18 and nozzle 16. Thus in operation, the steam nozzle 16 is removably connected by a snap on connector to the main conduit 18. Secondly, the receptacle 22 is filled with cream, milk or other desirable liquid that is to be mixed with steam. Once the steam is actuated, air, milk and steam will then be forced under pressure into the mixing chamber 28 where it is readily dispensed through outlet 28a. This provides a one step dispensing of cappuccino with the proper consistency and texture. This will greatly expedite commercial operations such as restaurants so that the beverage can be readily dispensed by a waitress and served immediately. Cleaning of the device and especially nozzle 16 and the air inlet channel 16d is simple because of its external location and snap-on connectors.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An aerating, mixing and dispensing device for providing a steam, milk and air mixture of a desired uniform consistency for cappucino comprising:
    a mixing chamber for mixing steam, milk and air, having an annular sidewall, a bottom surface connected to said annular sidewall, and a top annular edge, defining said chamber opening;
    a mixing chamber cover, mountable over said chamber;
    main inlet conduit, having distal and proximal ends connected in fluid communication at said proximal end into said mixing chamber;
    second inlet conduit, having distal and proximal ends, connected at said proximal end into the main inlet conduit substantially perpendicular, said second inlet conduit connectable at said distal end to a source of milk;
    third conduit having a steam nozzle portion disposed at a proximal end and a connection at a distal end for connection to a steam source, said steam nozzle end including a tapered end wall portion and an elongated external air inlet channel disposed longitudinally on a peripheral exterior portion of said third conduit, said nozzle air inlet channel having a predetermined depth and width forming a predetermined crossectional area, said third conduit steam nozzle portion having a diameter to permit slidable insertion within the free end of said main inlet conduit, whereby the main inlet conduit is sized in conjunction with the steam nozzle air inlet channel to provide a predetermined volume of air and steam flow into said main inlet conduit, said third conduit having a raised portion for stopping the insertion of said steam nozzle into said main inlet conduit at a predetermined position, said second inlet conduit connection inlet into the main inlet and the proximal end of said steam nozzle on said third conduit relative to said stop being sized so that when said steam nozzle is engaged within said main inlet conduit at said stop wall, the end portion of the nozzle will be disposed at a predetermined location relative to the second inlet conduit connection into the main inlet, whereby a proper mixture of air from the steam nozzle air inlet channel, milk from said second inlet conduit, and steam, is provided to achieve a uniform desired consistency; and
    outlet means connected to the bottom surface of said mixing chamber for dispensing the mixture of steam, milk and air received in said mixing chamber.

2. A mixing device as in claim 1, wherein:
    said mixing chamber lid includes a diverter plate sized so that a portion is received down into the mixing chamber outlet for diverting a mixture in the mixing chamber to the outlet.

3. A mixing device as in claim 1, wherein:
    said third inlet conduit housing said nozzle includes a connecting bead and said main inlet conduit, including a female groove that receives the nozzle connecting bead, said connecting bead and said main inlet conduit female groove being positioned relative to said third inlet conduit and said first main inlet conduit relative to said third inlet conduit stop to provide a snap-on, snap-off connector for said third inlet conduit nozzle, relative to said main inlet conduit.

* * * * *